United States Patent Office 2,868,639
Patented Jan. 13, 1959

2,868,639

METALLIC COMPOSITION

Homer S. Gonser, Jr., Rochester, Mich., assignor to Wall Colmonoy Corporation, Detroit, Mich., a corporation of New York No Drawing. Application October 6, 1955
Serial No. 539,013

5 Claims. (Cl. 75—171)

The present invention relates to hard surfacing alloys and, more particularly, to an improved hard surfacing alloy suitable for brazing and metal spraying operations.

Hard surfaces can be applied to base metals to impart wear-resistant surfaces which will outlast the original base metal many times over. Hard surfacing may be applied by melting a wear-resistant metal or alloy in the form of welding rods at the surface of the base metal either by gas welding or electric welding methods. It may be more conveniently applied by brazing processes and even more conveniently by metal spraying processes. In fact, the increasingly wide use for metal spraying operations in recent years is due to the high speed with which such operations can be carried out. It is important in both brazing and metal spraying operations that the hard surfacing alloy have good wetting properties. This is important where speed or area covered in a unit of time is an important consideration. Good wetting properties insure that the base metal is completely covered and that a continuous bond is formed on the base metal. It is likewise important that the hard surfacing alloy have good flow properties to increase the speed of operation and decrease operating costs. For particular purposes it is also important that the hard surfacing alloy have good corrosion resistance and especially this is important in high temperature applications.

For bearing surfaces, hard surfacing alloys must have extremely good wear-resistant qualities and where the parts which have been hard surfaced are subjected to stresses it is important that the hard surfacing alloy shall not fail. In this regard it is essential that the alloy be resistant to fretting corrosion. Fretting corrosion is a term employed to denote fatigue failure of the hard surfacing alloy when applied to bearing surfaces subjected to vibratory, repetitive or reversed stresses. The frequency of vibration has a marked effect on the rapidity with which fretting corrosion occurs. Metals will fail under such conditions at intensities of stresses much below that required to fail in tension under steady loading. Some form of corrosion usually caused by oxygen accelerates fatigue failure and this combination of fatigue failure (or fretting) and corrosion is called fretting corrosion. It is important that a hard surfacing alloy be resistant to fretting corrosion.

It is an object of the present invention to provide a hard surfacing alloy which is peculiarly adapted for brazing and metal spraying operations.

It is another object of the present invention to provide an alloy which has good wetting properties and good flow characteristics.

It is another object of the present invention to provide an alloy which is corrosion resistant and especially suitable for high temperature applications.

It is another object of the present invention to provide a hard surfacing alloy which is suitable for high speed production metal spraying processes.

It is still another object of the present invention to provide an alloy which has exceptionally high resistance to fretting and fretting corrosion.

Other objects and advantages of the invention will be apparent during the course of the following description.

The hard surfacing alloy of the present invention is especially adapted for brazing and metal spraying operations although it will be understood that the present invention is applicable to other uses, and comprises a nickel base alloy containing as principal constituents chromium, boron, silicon, iron, and at least one metal selected from the group consisting of tungsten and molybdenum. Broadly, the alloy comprises 7% to 17% chromium; 1% to 4.5% boron; 1% to 5.5% silicon; 0.10% to 5.5% iron; and 6% to 20% of at least one metal selected from the group consisting of tungsten and molybdenum; 0.05% to 2.5% carbon, the remainder nickel and minor amounts of impurities. As indicated, molybdenum or tungsten, or both, may be included in the alloy but tungsten without molybdenum is preferred due to the greater hardness and higher resistance to heat softening tungsten imparts to the alloy. A preferred range of composition is as follows: 11% to 15% chromium; 2.5% to 3.5% boron; 3% to 5% silicon; 3% to 5% iron; 14% to 17% tungsten; 0.5% to 1.2% carbon; the remainder nickel and minor amounts of impurities. Specific examples of compositions embodying the present invention are set forth in the following table:

*Specific composition examples*

| C | Cr | B | Fe | Si | W | Mo | Nickel plus incidental Impurities |
|---|---|---|---|---|---|---|---|
| 0.57 | 11.26 | 2.52 | 3.76 | 3.54 | 17.09 | Nil | Balance. |
| 0.79 | 12.55 | 3.07 | 4.01 | 3.82 | 15.72 | Nil | Do. |
| 1.10 | 13.27 | 3.49 | 4.37 | 4.02 | 14.95 | Nil | Do. |
| 0.77 | 12.75 | 3.13 | 4.07 | 3.83 | 7.86 | 7.31 | Do. |
| 0.98 | 13.01 | 3.26 | 4.25 | 4.00 | 12.03 | 4.02 | Do. |
| 0.60 | 11.17 | 2.49 | 3.81 | 3.60 | Nil | 16.81 | Do. |
| 0.87 | 12.48 | 3.02 | 3.99 | 3.68 | Nil | 14.11 | Do. |
| 1.13 | 14.26 | 3.57 | 4.40 | 4.09 | Nil | 12.93 | Do. |

The alloys of the present invention can be applied to the base metal by dip brazing, that is, by dipping the parts into a bath of the molten alloy or by conventional brazing methods. It can be applied by melting the alloy in the form of welding rods at the surface of the base metal either by gas welding or electric welding methods. The alloy is also suitable for casting and the casting can be used alone or subjoined to a base metal. In either case a hard, wear-resistant surface will be provided. The alloy may be used as a brazing alloy for joining metals having higher melting points. It is especially suitable for high-speed, heavy duty spray guns because of its good flow properties and wetting characteristics, the alloy being supplied either in wire form or as a dust or powder.

The alloy of the present invention has been tested under conditions of actual use for its wetting properties, flow characteristics, and corrosion resistance and resistance to fretting corrosion. The good wetting properties of the alloy of the present invention allow it to thoroughly wet the base metal to be hard surfaced and insure a tough, cohesive bond. The exceptional flow characteristics of the alloy adapt it for brazing processes. Its long plastic range (wide difference between liquidus and solidus temperatures) especially adapts it to metal spraying with subsequent fusion of the sprayed deposit. The long plastic range permits fusing of the sprayed deposit with practically no danger of the deposit sagging or running in the molten state. The corrosion resistance imparted to the alloy by the combination of constituents makes it ideally suited for applications at all normally used temperatures and especially at high temperatures where corrosion resistance plays an important role. Good wearing qualities exhibited by the alloy of the present invention, together with its excellent corrosion resistance have demonstrated its superior performance for bearing surfaces. It has been tested and found to have good resistance to fretting corrosion. In this respect it has been found to have exceptionally high endurance limits; that is, limiting stresses below which it will escape failure indefinitely under conditions of vibratory, repetitive or reversed stresses.

While it will be apparent that the preferred embodiment of the invention herein disclosed is well calculated to fulfill the objects above stated, it will be appreciated that the invention is susceptible to modification, variation and change without departing from the proper scope or fair meaning of the claims appended hereto.

What is claimed is:

1. An alloy for hard surfacing composed of 7% to 17% chromium; 1% to 4.5% boron; 1% to 5.5% silicon; 0.10% to 5.5% iron; and 6% to 20% of at least one metal selected from the group consisting of tungsten and molybdenum; 0.05% to 2.5% carbon; the remainder nickel and incidental impurities.

2. An alloy for hard surfacing composed of 11% to 15% chromium; 2.5% to 3.5% boron; 3% to 5% silicon; 3% to 5% iron; 14% to 17% tungsten; 0.5% to 1.2% carbon; the remainder nickel and incidental impurities.

3. A solid elongated metallic structure for hard surfacing composed of 11% to 15% chromium; 2.5% to 3.5% boron; 3% to 5% silicon; 3% to 5% iron; 14% to 17% tungsten; 0.5% to 1.2% carbon, the remainder nickel and incidental impurities.

4. An alloy powder for spray welding composed of 7% to 17% chromium; 1% to 4.5% boron; 1% to 5.5% silicon; 0.10% to 5.5% iron; and 6% to 20% of at least one metal selected from the group consisting of tungsten and molybdenum; 0.05% to 2.5% carbon; the remainder nickel and incidental impurities.

5. An alloy powder for spray welding composed of 11% to 15% chromium; 2.5% to 3.5% boron; 3% to 5% silicon; 3% to 5% iron; 14% to 17% tungsten; 0.5% to 1.2% carbon; the remainder nickel and incidental impurities.

References Cited in the file of this patent

UNITED STATES PATENTS

| | | |
|---|---|---|
| 2,245,566 | Bolton | June 17, 1941 |
| 2,458,502 | Cape | Jan. 11, 1949 |
| 2,467,288 | Baker et al. | Apr. 12, 1949 |
| 2,699,993 | MacNeill et al. | Jan. 18, 1955 |
| 2,743,177 | Cape | Apr. 24, 1956 |

OTHER REFERENCES

Rose et al.: The Welding Journal, January 1955, pages 30–34.